(12) United States Patent
Kitano (10) Patent No.: US 11,390,120 B2
(45) Date of Patent: Jul. 19, 2022

(54) HEAVY DUTY PNEUMATIC TIRE

(71) Applicant: SUMITOMO RUBBER INDUSTRIES, LTD., Kobe (JP)

(72) Inventor: Tetsuya Kitano, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 121 days.

(21) Appl. No.: 16/934,812

(22) Filed: Jul. 21, 2020

(65) Prior Publication Data

US 2021/0023884 A1      Jan. 28, 2021

(30) Foreign Application Priority Data

Jul. 22, 2019   (JP) .............................. JP2019-134342

(51) Int. Cl.
| | |
|---|---|
| *B60C 3/04* | (2006.01) |
| *B60C 11/01* | (2006.01) |
| *B60C 9/20* | (2006.01) |
| *B60C 9/28* | (2006.01) |
| *B60C 11/00* | (2006.01) |

(52) U.S. Cl.
CPC .................. *B60C 3/04* (2013.01); *B60C 9/20* (2013.01); *B60C 9/28* (2013.01); *B60C 11/0083* (2013.01); *B60C 2011/0033* (2013.01); *B60C 2200/06* (2013.01)

(58) Field of Classification Search
CPC .................. B60C 3/04; B60C 11/0083; B60C 2011/0033
See application file for complete search history.

(56) References Cited

U.S. PATENT DOCUMENTS

| | | | | |
|---|---|---|---|---|
| 10,000,091 | B2 * | 6/2018 | Gayton | ...................... B60C 5/00 |
| 2006/0124215 | A1 * | 6/2006 | Vu | .......................... B60C 11/00 |
| | | | | 152/209.12 |
| 2017/0008349 | A1 | 1/2017 | Tanaka | |

FOREIGN PATENT DOCUMENTS

| | | | |
|---|---|---|---|
| CA | 1319600 | * | 6/1993 |
| EP | 323519 | * | 7/1989 |
| EP | 596737 | * | 5/1994 |
| GB | 1215820 | * | 12/1970 |
| JP | 2007-83821 | * | 7/2007 |
| JP | 2009-6877 | * | 1/2009 |
| JP | 2017-19353 A | | 1/2017 |

* cited by examiner

*Primary Examiner* — Justin R Fischer
(74) *Attorney, Agent, or Firm* — Birch, Stewart, Kolasch & Birch, LLP (57) ABSTRACT

A tire 2 has a nominal cross-sectional width not less than 355 mm and a nominal aspect ratio not greater than 70%, and includes a tread 8 having a tread surface 4 that comes into contact with a road surface, and a belt 18 located radially inward of the tread 8. A ratio of a width of the tread surface 4 to a camber amount of the tread surface 4 at an end of the tread surface 4 is not less than 20 and not greater than 30. Regarding a thickness from the belt 18 to the tread surface 4, a ratio of a thickness at an equator plane to a thickness at an end 36 of the belt 18 is not less than 0.95 and not greater than 1.05.

14 Claims, 4 Drawing Sheets

HEAVY DUTY PNEUMATIC TIRE

TECHNICAL FIELD

The present invention relates to heavy duty pneumatic tires.

BACKGROUND ART

Due to running, uneven wear may occur on the tread of a tire. The uneven wear not only affects the appearance of the tire, but also affects the running performance and durability of the tire, since the uneven wear changes the contact pressure distribution of the tire.

A large load acts on a heavy duty pneumatic tire mounted on a vehicle such as a truck or a bus. Thus, uneven wear is likely to occur in the tire. Therefore, various studies have been conducted to suppress occurrence of uneven wear (for example, PATENT LITERATURE 1 below).

CITATION LIST

Patent Literature

PATENT LITERATURE 1: Japanese Laid-Open Patent Publication No. 2017-19353

SUMMARY OF INVENTION

Technical Problem

In a tire having a nominal cross-sectional width not less than 355 mm and a nominal aspect ratio not greater than 70%, each shoulder portion more easily expands than a center portion. Thus, in the tire, a ground-contact surface tends to have a shape that is constricted at the center portion, and thus wear is likely to occur at the center portion.

In a profile of the tread surface, when the radius of a circular arc representing the center portion is decreased, expansion of each shoulder portion is suppressed, and the above-described constriction of the ground-contact surface at the center portion may be eliminated. On the other hand, a sufficient ground-contact surface cannot be ensured at each shoulder portion, so that there is a concern that each shoulder portion more easily slips on a road surface. In this case, wear is likely to occur at each shoulder portion.

When the tread at each shoulder portion is made thicker, occurrence of uneven wear can be suppressed while an appropriate ground-contact surface shape is ensured. However, in this case, the thicker tread increases the rolling resistance.

The present invention has been made in view of the above circumstances, and an object of the present invention is to provide a heavy duty pneumatic tire that can suppress occurrence of uneven wear without increasing rolling resistance.

Solution to Problem

A heavy duty pneumatic tire according to an aspect of the present invention has a nominal cross-sectional width not less than 355 mm and a nominal aspect ratio not greater than 70%, and includes a tread having a tread surface that comes into contact with a road surface, and a belt located radially inward of the tread. A plurality of circumferential grooves are formed on the tread surface so as to be aligned in an axial direction, and two circumferential grooves located axially outward among these circumferential grooves are shoulder circumferential grooves. A ratio of a width of the tread surface to a camber amount of the tread surface at an end of the tread surface is not less than 20 and not greater than 35. Regarding a thickness from the belt to the tread surface, a ratio of a thickness at an equator plane to a thickness at an end of the belt is not less than 0.95 and not greater than 1.05.

Preferably, in the heavy duty pneumatic tire, a ratio of an interval between the two shoulder circumferential grooves to a camber amount of the tread surface at the shoulder circumferential groove is not less than 25 and not greater than 40.

Preferably, in the heavy duty pneumatic tire, a ratio of a width of the belt to the width of the tread surface is not less than 0.85 and not greater than 0.94.

Preferably, in the heavy duty pneumatic tire, the belt includes a plurality of belt plies layered in a radial direction, and each of the belt plies includes a large number of belt cords tilted relative to the equator plane. A belt ply having a maximum width among the plurality of belt plies is a wide ply, and an angle formed by each belt cord of the wide ply with respect to the equator plane is not less than 14° and not greater than 16°.

Preferably, in the heavy duty pneumatic tire, a belt ply having a minimum width among the plurality of belt plies is a narrow ply. An angle formed by each belt cord of the narrow ply with respect to the equator plane is equal to the angle formed by each belt cord of the wide ply with respect to the equator plane, or larger than the angle formed by each belt cord of the wide ply with respect to the equator plane.

Preferably, in the heavy duty pneumatic tire, an end of the narrow ply is located outward of the shoulder circumferential groove in the axial direction.

Preferably, in the heavy duty pneumatic tire, a camber amount of the wide ply at an end of the wide ply is smaller than a camber amount of the tread surface at a position, on the tread surface, corresponding to the end of the wide ply.

Preferably, in the heavy duty pneumatic tire, a ratio of the camber amount of the wide ply at the end of the wide ply to the camber amount of the tread surface at the position, on the tread surface, corresponding to the end of the wide ply is not less than 0.7 and not greater than 0.9.

Preferably, in the heavy duty pneumatic tire, a contour of the tread surface is represented by a plurality of circular arcs, the plurality of circular arcs include a first circular arc which represents a contour of a portion from an inner edge of one shoulder circumferential groove to an inner edge of the other shoulder circumferential groove, and a second circular arc which is located axially outward of the first circular arc and represents a contour of a portion from an outer edge of the shoulder circumferential groove to the end of the tread surface. The first circular arc is a circular arc that projects outward. The second circular arc is a circular arc that projects inward.

Preferably, in the heavy duty pneumatic tire, a radius of the second circular arc is larger than a radius of the first circular arc.

Preferably, in the heavy duty pneumatic tire, a ratio of the radius of the second circular arc to the radius of the first circular arc is not less than 4.5 and not greater than 6.5.

Preferably, in the heavy duty pneumatic tire, the radius of the first circular arc is not less than 600 mm and not greater than 700 mm.

Advantageous Effects of Invention

In the heavy duty pneumatic tire according to the present invention, occurrence of uneven wear is suppressed without increasing the rolling resistance.

DESCRIPTION OF EMBODIMENTS

The following will describe in detail the present invention based on preferred embodiments with appropriate reference to the drawings.

In the present invention, a state where a tire is mounted on a normal rim, the internal pressure of the tire is adjusted to a normal internal pressure, and no load is applied to the tire is referred to as a normal state.

The normal rim means a rim specified in a standard on which the tire is based. The "standard rim" in the JATMA standard, the "Design Rim" in the TRA standard, and the "Measuring Rim" in the ETRTO standard are normal rims.

The normal internal pressure means an internal pressure specified in the standard on which the tire is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures.

A normal load means a load specified in the standard on which the tire is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRTO standard are normal loads.

Figure 1:
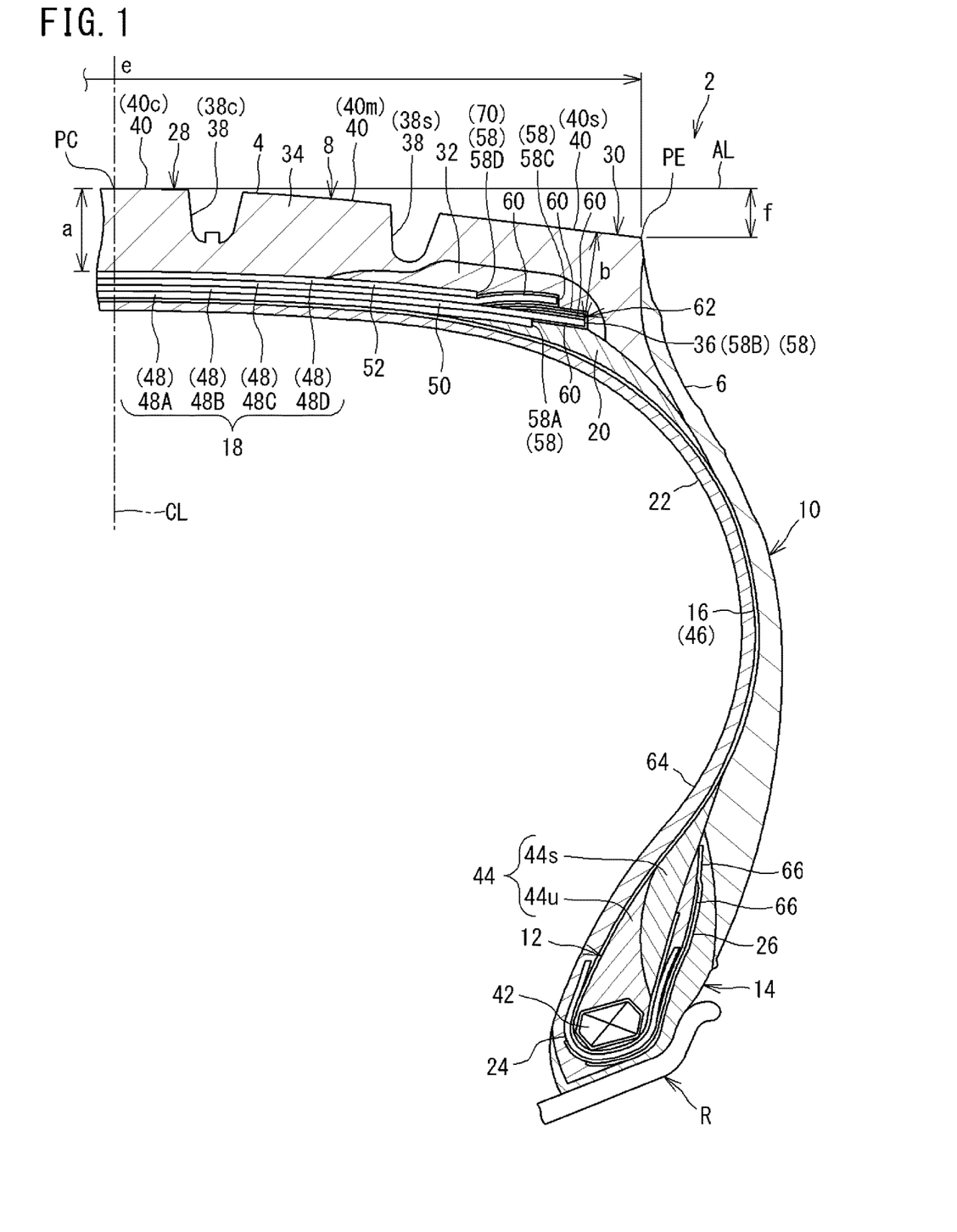
FIG. 1 is a cross-sectional view showing a part of a heavy duty pneumatic tire according to an embodiment of the present invention.

FIG. 1 shows a part of a heavy duty pneumatic tire 2 (hereinafter, simply referred to as "tire 2") according to an embodiment of the present invention. The tire 2 is mounted to a vehicle such as a truck or a bus. The nominal cross-sectional width of the tire 2 is not less than 355 mm. The nominal aspect ratio of the tire 2 is not greater than 70%.

The nominal cross-sectional width and the nominal aspect ratio are the "nominal cross-sectional width" and the "nominal aspect ratio" in "Tyre size designation" specified in JIS D4202 "Automobile tyres—Designation and dimensions".

FIG. 1 shows a part of a cross-section of the tire 2 along a plane including the rotation axis of the tire 2. FIG. 1 shows a state of the tire 2 where the tire 2 is mounted on a rim R (normal rim), the internal pressure of the tire 2 is adjusted to 5% of the normal internal pressure, and no load is applied to the tire 2. This state of the tire 2 is referred to as a reference state. Unless otherwise specified, the dimensions and angles of components of the tire 2 are measured in the reference state. Dimensions and angles associated with an outer surface 6 of the tire 2, such as the contour of the tread surface 4, may be specified in the cavity surface of a mold (not shown) for forming the outer surface 6 of the tire 2.

In FIG. 1, the right-left direction is the axial direction of the tire 2, and the up-down direction is the radial direction of the tire 2. The direction perpendicular to the surface of the sheet of FIG. 1 is the circumferential direction of the tire 2. In FIG. 1, an alternate long and short dash line CL represents the equator plane of the tire 2.

The tire 2 includes a tread 8, a pair of sidewalls 10, a pair of beads 12, a pair of chafers 14, a carcass 16, a belt 18, a pair of cushion layers 20, an inner liner 22, a pair of steel reinforced layers 24, and a pair of fiber reinforced layers 26.

The tread 8 is formed from a crosslinked rubber. The tread 8 comes into contact with a road surface at a tread surface 4 thereof. That is, the tread 8 has the tread surface 4 that comes into contact with a road surface. In FIG. 1, reference character PC represents the point of intersection of the tread surface 4 and the equator plane CL. The point of intersection PC corresponds to the equator of the tire 2. The tread surface 4 has a shape that projects radially outward.

In FIG. 1, reference character PE represents an end of the tread surface 4. A double-headed arrow e represents the width of the tread surface 4. The width e is represented by the distance in the axial direction from one end PE of the tread surface 4 to the other end PE of the tread surface 4. In the tire 2, if an end of the tread surface 4 is indistinguishable from the appearance, the outer end in the axial direction of a ground-contact surface obtained by applying the normal load to the tire 2 in the normal state and bringing the tire 2 into contact with a flat surface at a camber angle of 0° is defined as an end PE of the tread surface 4.

In the tire 2, a portion at the equator plane CL is a center portion 28, and a portion at each end PE of the tread surface 4 is a shoulder portion 30.

The tread 8 includes a pair of base portions 32 and a cap portion 34. These base portions 32 are disposed at an interval in the axial direction. Each base portion 32 covers a portion of the belt 18 at an end 36 thereof. The base portion 32 is located radially inward of the cap portion 34. The base portion 32 is formed from a crosslinked rubber that has low heat generation properties and for which adhesion is taken into consideration. The cap portion 34 covers the base portions 32 at both sides. The cap portion 34 includes the tread surface 4. The cap portion 34 is formed from a crosslinked rubber for which wear resistance and grip performance are taken into consideration.

In the tire 2, a plurality of circumferential grooves 38 are formed on the tread surface 4 so as to be aligned in the axial direction. These circumferential grooves 38 continuously extend in the circumferential direction. At least four circumferential grooves 38 are normally formed on the tread surface 4. In the tire 2 shown in FIG. 1, four circumferential grooves 38 are formed on the tread surface 4.

Among the four circumferential grooves 38, the circumferential grooves 38 located at the inner side in the axial direction, that is, the circumferential grooves 38 near the equator PC, are center circumferential grooves 38c. The circumferential grooves 38 located at the outermost sides in the axial direction, that is, the circumferential grooves 38 near the ends PE of the tread surface 4, are shoulder circumferential grooves 38s. In the tire 2, the four circumferential grooves 38 includes two center circumferential grooves 38c and two shoulder circumferential grooves 38s. In the case where the circumferential grooves 38 formed on the tread surface 4 include a circumferential groove 38 located on the equator PC, the circumferential groove 38 located on the equator PC is defined as a center circumferential groove. Moreover, in the case where a circumferential groove 38 is present between each center circumferential groove 38*c* and each shoulder circumferential groove 38*s*, the circumferential groove 38 is defined as a middle circumferential groove.

In the tire 2, from the viewpoint of contribution to drainage performance and traction performance, the width in the axial direction of each center circumferential groove 38*c* is preferably about 2 to 10% of the width e of the tread surface 4. The depth of each center circumferential groove 38*c* is preferably 13 to 25 mm. The width in the axial direction of each shoulder circumferential groove 38*s* is preferably about 1 to 7% of the width e of the tread surface 4. The depth of each shoulder circumferential groove 38*s* is preferably 13 to 25 mm.

In the tire 2, by forming the plurality of circumferential grooves 38 aligned in the axial direction on the tread surface 4, a plurality of land portions 40 are formed in the tread surface 4 so as to be aligned in the axial direction. As shown in FIG. 1, in the tire 2, five land portions 40 are formed by forming the four circumferential grooves 38 on the tread surface 4.

Among the five land portions 40, the land portion 40 located at the inner side in the axial direction, that is, the land portion 40 located on the equator PC, is a center land portion 40*c*. The land portions 40 located at the outermost sides in the axial direction, that is, the land portions 40 including the ends PE of the tread surface 4, are shoulder land portions 40*s*. The land portions 40 located between the center land portion 40*c* and the shoulder land portions 40*s* are middle land portions 40*m*. In the case where, among the land portions 40 formed in the tread 8, the land portion 40 located at the inner side in the axial direction is located not on the equator PC but near the equator PC, the land portion 40 located near the equator PC, that is, the land portion 40 located at the equator PC side, is defined as a center land portion.

In the tire 2, the width in the axial direction of the center land portion 40*c* is not less than 10% and not greater than 18% of the width e of the tread surface 4. The width in the axial direction of each middle land portion 40*m* is not less than 0.9 times and not greater than 1.1 times that of the center land portion 40*c*. The width in the axial direction of each shoulder land portion 40*s* is not less than 1.3 times and not greater than 1.6 times that of the center land portion 40*c*.

Each sidewall 10 is connected to an end of the tread 8. The sidewall 10 extends radially inward from the end of the tread 8. The sidewall 10 is formed from a crosslinked rubber.

Each bead 12 is located radially inward of the sidewall 10. The bead 12 includes a core 42 and an apex 44.

The core 42 extends in the circumferential direction. The core 42 includes a wound wire made of steel. The core 42 has a substantially hexagonal cross-sectional shape.

The apex 44 is located radially outward of the core 42. The apex 44 includes an inner apex 44*u* and an outer apex 44*s*. The inner apex 44*u* extends radially outward from the core 42. The outer apex 44*s* is located radially outward of the inner apex 44*u*. The inner apex 44*u* and the outer apex 44*s* are each formed from a crosslinked rubber. The outer apex 44*s* is more flexible than the inner apex 44*u*.

Each chafer 14 is located axially outward of the bead 12. The chafer 14 is located radially inward of the sidewall 10. The chafer 14 comes into contact with the rim R. The chafer 14 is formed from a crosslinked rubber.

The carcass 16 is located inward of the tread 8, each sidewall 10, and each chafer 14. The carcass 16 includes at least one carcass ply 46. The carcass 16 of the tire 2 is composed of one carcass ply 46. In the tire 2, the carcass ply 46 is turned up around each core 42 from the inner side toward the outer side in the axial direction.

The carcass ply 46 includes a large number of carcass cords aligned with each other, which are not shown. The carcass cords are covered with a topping rubber. Each carcass cord intersects the equator plane CL. In the tire 2, the angle of each carcass cord relative to the equator plane CL is not less than 70° and not greater than 90°. The carcass 16 has a radial structure. The material of the carcass cords is steel. A cord formed from an organic fiber may be used as each carcass cord.

The belt 18 is located radially inward of the tread 8. The belt 18 is located radially outward of the carcass 16.

The belt 18 includes a plurality of belt plies 48 layered in the radial direction. The belt 18 of the tire 2 includes four belt plies 48. In the tire 2, the number of belt plies 48 forming the belt 18 is not particularly limited. The configuration of the belt 18 is determined as appropriate in consideration of the specifications of the tire 2.

In the tire 2, among the four belt plies 48, a second belt ply 48B located between a first belt ply 48A and a third belt ply 48C has the maximum width in the axial direction. A fourth belt ply 48D located at the outermost side in the radial direction has the minimum width in the axial direction. In the tire 2, the second belt ply 48B is a wide ply 50 having the maximum width among the plurality of belt plies 48 forming the belt 18. The fourth belt ply 48D is a narrow ply 52 having the minimum width among the plurality of belt plies 48 forming the belt 18.

Figure 2:
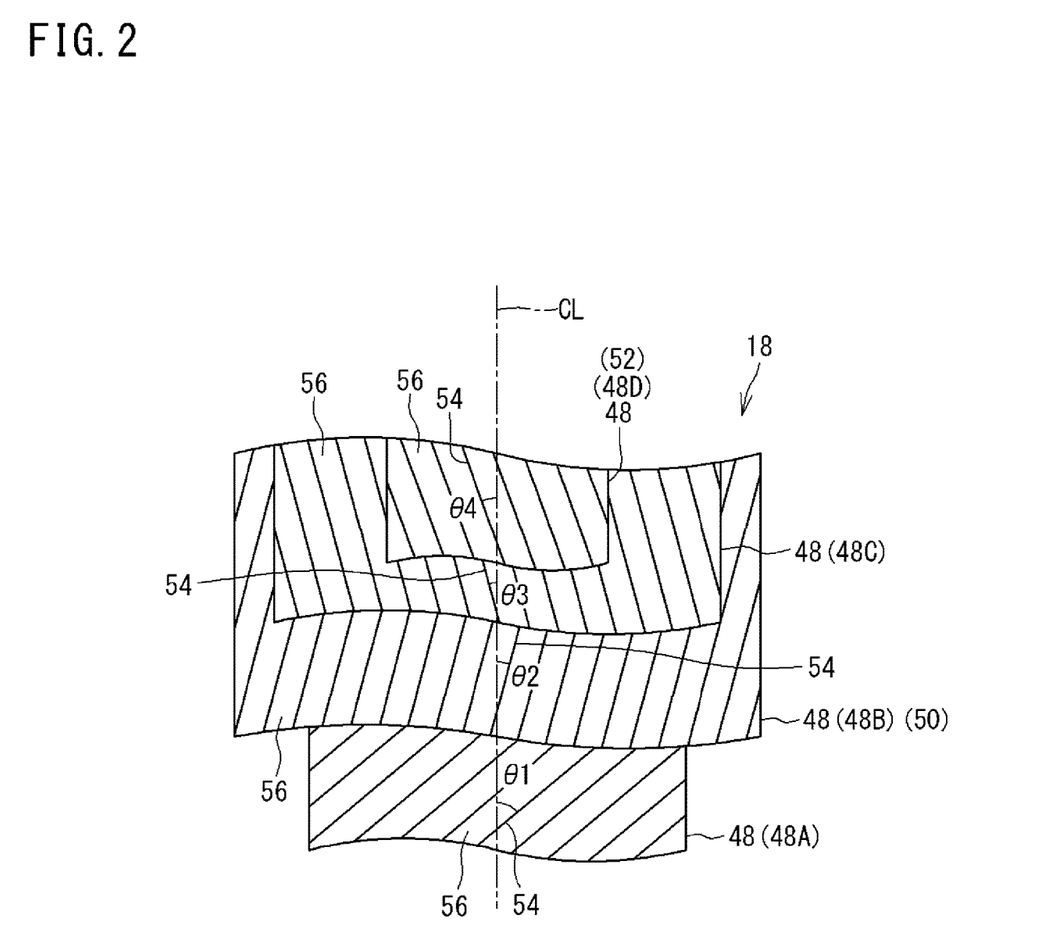
FIG. 2 is a schematic diagram showing arrangement of belt cords included in a belt.

FIG. 2 shows the configuration of the belt 18 of the tire 2. In FIG. 2, the right-left direction is the axial direction of the tire 2, and the up-down direction is the circumferential direction of the tire 2.

Each of the belt plies 48, which form the belt 18, includes a large number of belt cords 54 aligned with each other. The material of the belt cords 54 is steel. The belt cords 54 are covered with a topping rubber 56. In FIG. 2, for the convenience of description, the belt cords 54 covered with the topping rubbers 56 are represented by solid lines.

Each belt cord 54 is tilted relative to the equator plane CL. In the tire 2, the belt 18 is configured such that the belt cords 54 of one belt ply 48 intersect the belt cords 54 of another belt ply 48 layered on the one belt ply 48.

As shown in FIG. 2, the direction in which the belt cords 54 of the first belt ply 48A are tilted relative to the equator plane CL is the same as the direction in which the belt cords 54 of the second belt ply 48B are tilted relative to the equator plane CL. The direction in which the belt cords 54 of the second belt ply 48B are tilted relative to the equator plane CL are opposite to the direction in which the belt cords 54 of the third belt ply 48C are tilted relative to the equator plane CL. The direction in which the belt cords 54 of the third belt ply 48C are tilted relative to the equator plane CL is the same as the direction in which the belt cords 54 of the fourth belt ply 48D are tilted relative to the equator plane CL. The direction in which the belt cords 54 of the first belt ply 48A are tilted relative to the equator plane CL may be opposite to the direction in which the belt cords 54 of the second belt ply 48B are tilted relative to the equator plane CL, and the direction in which the belt cords 54 of the third belt ply 48C are tilted relative to the equator plane CL may be opposite to the direction in which the belt cords 54 of the fourth belt ply 48D are tilted relative to the equator plane CL.

As shown in FIG. 1, each of an end 58B of the second belt ply 48B and an end 58C of the third belt ply 48C is covered with a rubber layer 60. Two rubber layers 60 are further disposed between the end 58B and the end 58C, which are covered with the rubber layers 60. In the tire 2, an edge member 62 including four rubber layers 60 in total is interposed between the end 58B of the second belt ply 48B and the end 58C of the third belt ply 48C. Accordingly, the end 58C of the third belt ply 48C is pushed radially outward and disposed so as to be separated from the end 58B of the second belt ply 48B. The edge member 62 is formed from a crosslinked rubber.

Each cushion layer 20 is located between the belt 18 and the carcass 16 at the portion of the belt 18 at the end 36 thereof. The cushion layer 20 is formed from a crosslinked rubber.

The inner liner 22 is located inward of the carcass 16. The inner liner 22 forms an inner surface 64 of the tire 2. The inner liner 22 is formed from a crosslinked rubber that has an excellent air blocking property. The inner liner 22 maintains the internal pressure of the tire 2.

Each steel reinforced layer 24 is located at a bead 12 portion. The steel reinforced layer 24 is turned up around the core 42 from the inner side toward the outer side in the axial direction along the carcass ply 46. In the tire 2, the steel reinforced layer 24 is in contact with the carcass ply 46.

The steel reinforced layer 24 includes a large number of filler cords aligned with each other, which are not shown. The filler cords are covered with a topping rubber in the steel reinforced layer 24. The material of the filler cords is steel.

Each fiber reinforced layer 26 is located axially outward of the bead 12 and covers an end portion of an axially outer portion of the steel reinforced layer 24. The fiber reinforced layer 26 includes two plies 66. Each of the plies 66 includes a large number of fiber cords aligned with each other, which are not shown. The fiber cords are covered with a topping rubber in the fiber reinforced layer 26. The fiber cords are formed from an organic fiber. The organic fiber is preferably a nylon fiber.

In FIG. 1, a solid line AL is a first camber reference line that passes through the equator PC and extends in the axial direction. A double-headed arrow f represents a camber amount of the tread surface 4 at the end PE of the tread surface 4. The camber amount f is represented by the distance in the radial direction from the end PE of the tread surface 4 to the first camber reference line AL.

In FIG. 1, a double-headed arrow a represents the thickness of the tread 8 at the equator plane CL. The thickness a is represented by the distance from the belt 18 to the tread surface 4 (specifically, the equator PC). The thickness a is measured along a line normal to the tread surface 4 and passing through the equator PC, that is, along the equator plane CL. A double-headed arrow b represents the thickness of the tread 8 at the end 36 of the belt 18 (in the tire 2, the end 58B of the second belt ply 48B). The thickness b is represented by the distance from the end 36 of the belt 18 to the tread surface 4. The thickness b is measured along a line normal to the tread surface 4 and passing through the end 36 of the belt 18.

In the tire 2, the ratio of the width e of the tread surface 4 to the camber amount f of the tread surface 4 at the end PE of the tread surface 4 is not less than 20 and not greater than 35. Regarding the thickness from the belt 18 to the tread surface 4 of the tread 8, the ratio of the thickness a at the equator plane CL to the thickness b at the end 36 of the belt 18 is not less than 0.95 and not greater than 1.05.

In the tire 2, since the tread surface 4 has an appropriately curved shape, the shoulder portion 30 can make proper contact with a road surface and gaping at each shoulder circumferential groove 38s is suppressed. In the tire 2, occurrence of wear at the shoulder portion 30 is suppressed. Furthermore, occurrence of constriction of a ground-contact surface (not shown) at the center portion 28, which is confirmed in the conventional tire, is suppressed. Thus, the tire 2 can be configured such that, as the thickness from the belt 18 to the tread surface 4, the center portion 28 has a thickness similar to the thickness of the shoulder portion 30. In the tire 2, the influence of the center portion 28 on the rolling resistance is suppressed, and the occurrence of wear at the center portion 28 is also suppressed. In the tire 2, occurrence of uneven wear is suppressed without increasing the rolling resistance.

Figure 3:
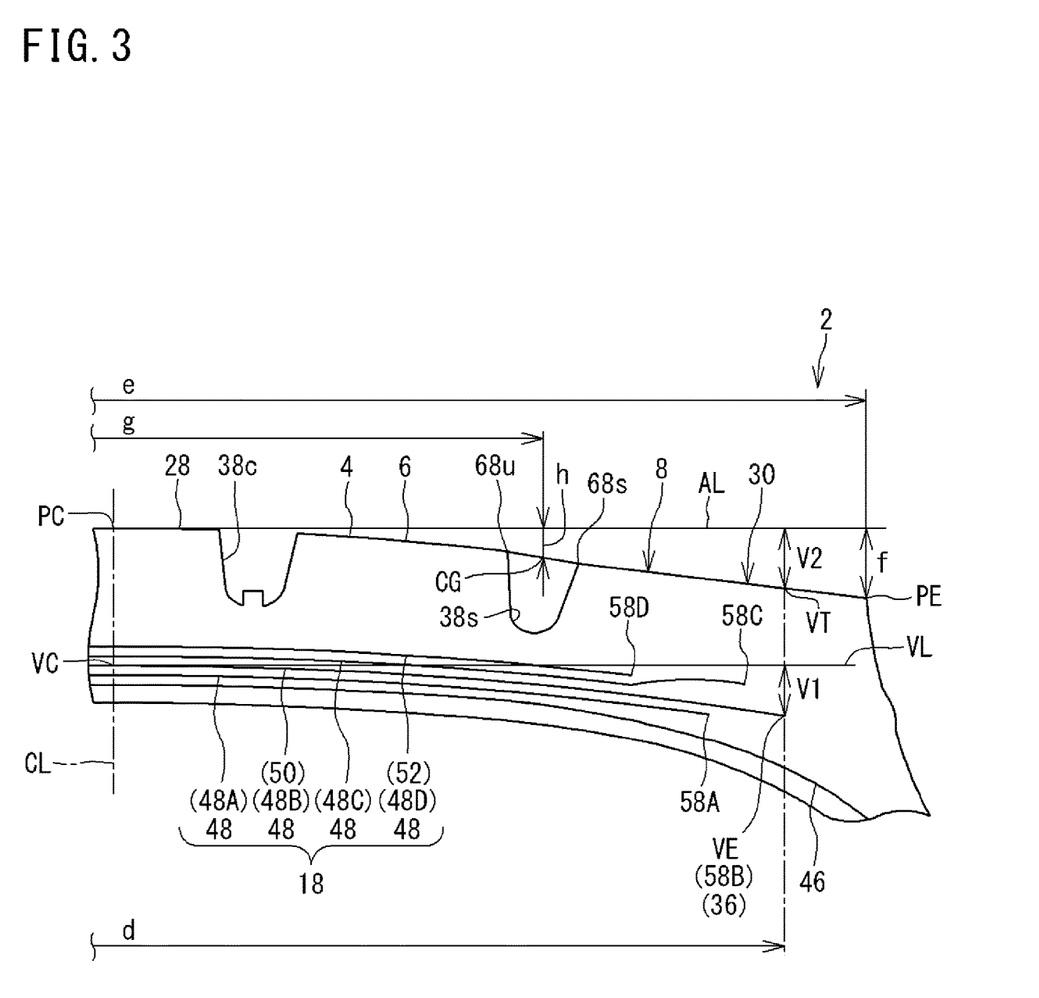
FIG. 3 is an enlarged cross-sectional view showing a part of the tire in FIG. 1.

FIG. 3 shows a tread 8 portion of the tire 2 shown in FIG. 1. In FIG. 3, the right-left direction is the axial direction of the tire 2, the up-down direction is the radial direction of the tire 2. The direction perpendicular to the surface of the sheet of FIG. 3 is the circumferential direction of the tire 2.

FIG. 3 shows the contour of the tread surface 4 and the contour of the radially outer surface of each belt ply 48 forming the belt 18 (hereinafter, also referred to as the outer surface of the belt ply 48). The contour of the tread surface 4 and the contour of the belt 18 can be specified, for example, using a sectional image of the tire 2 taken by a computed tomography method using X-rays (hereinafter, X-ray CT method). In this case, the sectional image of the tire 2 taken by the X-ray CT method is imported into computer-aided design (CAD), and the contour of the tread surface 4 and the contours of the belt plies 48 forming the belt 18 are specified on the CAD. If the contours of the outer surfaces of the belt plies 48 cannot be specified in the sectional image, the contour of each belt ply 48 forming the belt 18 can be specified by drawing a line at the tread 8 side portion of the belt cords 54 included in the belt ply 48 along the belt cords 54.

In FIG. 3, reference character CG represents the center of the shoulder circumferential groove 38s. The center CG is specified by the center of the opening width of the groove. The center CG is located on a straight line connecting one edge (inner edge 68u) and another edge (outer edge 68s) of the shoulder circumferential groove 38s. A double-headed arrow g represents the distance in the axial direction from the center CG of one shoulder circumferential groove 38s to the center CG of the other shoulder circumferential groove 38s. The distance g in the axial direction is the interval between the two shoulder circumferential grooves 38s formed on the tread surface 4. A double-headed arrow h represents a camber amount of the tread surface 4 at the shoulder circumferential groove 38s. The camber amount h is represented by the distance in the radial direction from the center CG of the shoulder circumferential groove 38s to the first camber reference line AL.

In the tire 2, the ratio of the interval g between the two shoulder circumferential grooves 38s to the camber amount h of the tread surface 4 at the shoulder circumferential groove 38s is preferably not less than 25 and preferably not greater than 40.

When this ratio is set to be not less than 25, the curved shape of the tread surface 4 is more effectively adjusted. The shoulder portion 30 can make proper contact with a road surface. Thus, in the tire 2, occurrence of wear at the shoulder portion 30 is effectively suppressed. When this ratio is set to be not greater than 40, the curved shape of the tread surface 4 effectively contributes to suppression of gaping at the shoulder circumferential groove 38s. In this case as well, in the tire 2, occurrence of wear at the shoulder portion 30 is effectively suppressed.

In the tire 2, from the viewpoint that the shoulder portion 30 can make proper contact with a road surface and gaping at the shoulder circumferential groove 38s is suppressed, the ratio of the camber amount h of the tread surface 4 at the shoulder circumferential groove 38s to the camber amount f of the tread surface 4 at the end PE of the tread surface 4 is preferably not less than 0.35 and preferably not greater than 0.45. In the tire 2, occurrence of wear at the shoulder portion 30 is effectively suppressed.

In FIG. 3 reference character VE represents an end of the second belt ply 48B, that is, the wide ply 50. The end VE of the wide ply 50 is also the end 36 of the belt 18. Reference character VC represents the point of intersection of the wide ply 50 and the equator plane CL. A solid line VL is a second camber reference line. The second camber reference line VL passes through the point of intersection VC of the wide ply 50 and the equator plane CL and extends in the axial direction. A double-headed arrow V1 represents a camber amount of the wide ply 50 at the end VE of the wide ply 50. The camber amount V1 is represented by the distance in the radial direction from the end VE of the wide ply 50 to the second camber reference line VL. Reference character VT represents the point of intersection of the tread surface 4 and a straight line passing through the end VE of the wide ply 50 and extending in the radial direction. The point of intersection VT is the position, on the tread surface 4, corresponding to the end VE of the wide ply 50. A double-headed arrow V2 represents a camber amount of the tread surface 4 at the position VT, on the tread surface 4, corresponding to the end VE of the wide ply 50. The camber amount V2 is represented by the distance in the radial direction from the position VT, on the tread surface 4, corresponding to the end VE of the wide ply 50 to the first camber reference line AL.

In the tire 2, as with the tread surface 4, the belt 18 also has a shape that projects radially outward. In the tire 2, the camber amount V1 of the wide ply 50 at the end VE of the wide ply 50 is preferably smaller than the camber amount V2 of the tread surface 4 at the position VT, on the tread surface 4, corresponding to the end VE of the wide ply 50. In the tire 2, the influence of the belt 18 on the effect provided by the contour of the tread surface 4 is effectively suppressed. The belt 18 effectively contributes to reduction in the rolling resistance and suppression of occurrence of uneven wear. From this viewpoint, the ratio of the camber amount V1 of the wide ply 50 at the end VE of the wide ply 50 to the camber amount V2 of the tread surface 4 at the position VT, on the tread surface 4, corresponding to the end VE of the wide ply 50 is more preferably not less than 0.7 and more preferably not greater than 0.9.

In FIG. 3, a double-headed arrow d represents the distance in the axial direction from one end VE of the wide ply 50 to the other end VE of the wide ply 50. The distance d in the axial direction is the width of the wide ply 50, that is, the belt 18.

In the tire 2, the ratio of the width d of the belt 18 to the width e of the tread surface 4 is preferably not less than 0.85 and preferably not greater than 0.94.

When this ratio is set to be not less than 0.85, the belt 18 contributes to ensuring the stiffness of the shoulder portion 30. Deformation of the shoulder portion 30 is suppressed, and thus occurrence of wear at the shoulder portion 30 is suppressed. When this ratio is set to be not greater than 0.94, the width of the belt 18 is appropriately maintained, and the influence of the curve of the belt 18 on the contour of the tread surface 4 is suppressed. The shoulder portion 30 can make proper contact with a road surface. Thus, in this case as well, occurrence of wear at the shoulder portion 30 is effectively suppressed.

In FIG. 2, an angle $\theta 1$ is the angle formed by each belt cord 54 included in the first belt ply 48A with respect to the equator plane CL. An angle $\theta 2$ is the angle formed by each belt cord 54 included in the second belt ply 48B with respect to the equator plane CL. An angle $\theta 3$ is the angle formed by each belt cord 54 included in the third belt ply 48C with respect to the equator plane CL. An angle $\theta 4$ is the angle formed by each belt cord 54 included in the fourth belt ply 48D with respect to the equator plane CL.

In the tire 2, the angle $\theta 2$ (hereinafter, tilt angle $\theta 2$) formed by each belt cord 54 included in the second belt ply 48B, that is, the wide ply 50, with respect to the equator plane CL is preferably not greater than 16°. Accordingly, the influence of the wide ply 50 on the effect provided by the contour of the tread surface 4 is effectively suppressed. In the tire 2, the shoulder portion 30 can make proper contact with a road surface, and gaping at the shoulder circumferential groove 38s is suppressed. The wide ply 50 effectively contributes to suppression of occurrence of wear at the shoulder portion 30. In the tire 2, the tilt angles of the belt cords 54 in the belt plies 48 cannot be set to angles smaller than 14°, since it becomes difficult to form the belt plies 48. From the viewpoint of ease of production, the tilt angle $\theta 2$ is preferably not less than 14°.

In the tire 2, from the viewpoint that the belt 18 that can effectively contribute to ensuring the stiffness of the tread 8 portion is formed, the tilt angle $\theta 3$ of each belt cord 54 included in the third belt ply 48C, which is located radially outward of the wide ply 50, is preferably equal to the tilt angle $\theta 2$ of each belt cord 54 included in the wide ply 50.

From the same viewpoint, the tilt angle $\theta 1$ of each belt cord 54 included in the first belt ply 48A, which is located radially inward of the wide ply 50, is preferably larger than the tilt angle $\theta 2$ of each belt cord 54 included in the wide ply 50. Specifically, the tilt angle $\theta 1$ is preferably not less than 45° and preferably not greater than 70°.

Furthermore, from the same viewpoint, the tilt angle $\theta 4$ of each belt cord 54 included in the fourth belt ply 48D, that is, the narrow ply 52, is preferably equal to the tilt angle $\theta 2$ of each belt cord 54 included in the wide ply 50 or larger than the tilt angle $\theta 2$. When the tilt angle $\theta 4$ is larger than the tilt angle $\theta 2$, the difference between the tilt angle $\theta 4$ and the tilt angle $\theta 2$ is more preferably not less than 1° and more preferably not greater than 5°.

As shown in FIG. 1, in the tire 2, an end 58D of the fourth belt ply 48D is located outward of the shoulder circumferential groove 38s in the axial direction. As described above, the fourth belt ply 48D is the narrow ply 52. Therefore, in the tire 2, the ends 58 of the belt plies 48 forming the belt 18 are all located outward of the shoulder circumferential groove 38s in the axial direction. The belt 18 can effectively contribute to ensuring the stiffness of the tread 8 portion. In particular, the belt 18 contributes to suppression of gaping at the shoulder circumferential groove 38s. From this viewpoint, an end 70 of the belt ply 48 having the minimum width among the plurality of belt plies 48 forming the belt 18, that is, the narrow ply 52, is preferably located outward of the shoulder circumferential groove 38s in the axial direction.

Figure 4:
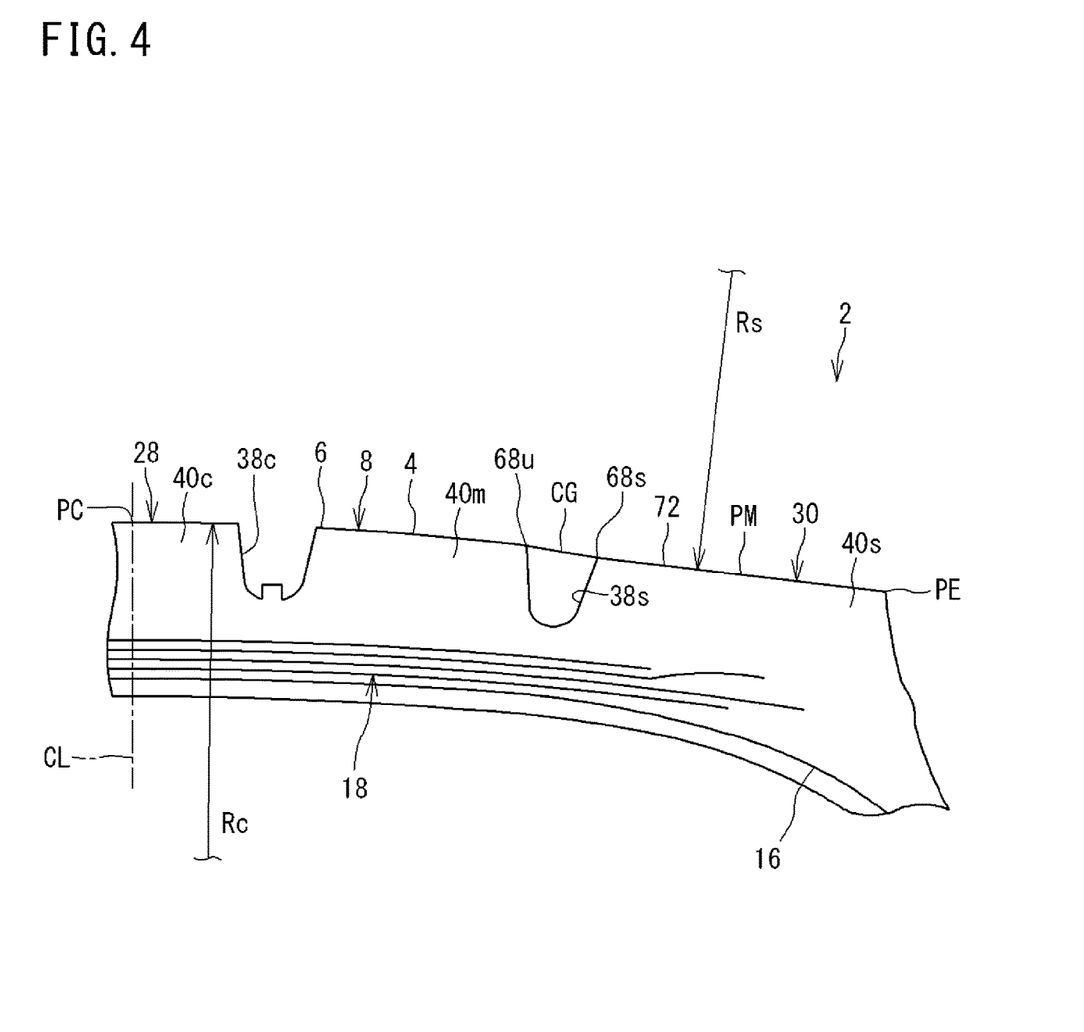
FIG. 4 is an enlarged cross-sectional view showing the contour of a tread portion.

A cross-section shown in FIG. 4 shows the contour of the tread 8 portion of the tire 2 shown in FIG. 1, specifically, the contour of the tread surface 4. In FIG. 4, the right-left direction is the axial direction of the tire 2, and the up-down direction is the radial direction of the tire 2. The direction perpendicular to the surface of the sheet of FIG. 4 is the circumferential direction of the tire 2.

In the tire 2, the center portion 28 is a portion from the inner edge 68*u* of one shoulder circumferential groove 38*s* to the inner edge 68*u* of the other shoulder circumferential groove 38*s*. Each shoulder portion 30 is a portion from the outer edge 68*s* of the shoulder circumferential groove 38*s* to the end PE of the tread surface 4. A portion from the inner edge 68*u* to the outer edge 68*s* of each shoulder circumferential groove 38*s* is a boundary portion between the center portion 28 and the shoulder portion 30.

In the tire 2, as the contour of the tread surface 4, the center portion 28 is represented by a circular arc (hereinafter, also referred to as first circular arc) that projects outward. The shoulder portion 30 is represented by a circular arc (hereinafter, also referred to as second circular arc) that projects inward. In FIG. 4, an arrow Rc represents the radius of the first circular arc, and an arrow Rs represents the radius of the second circular arc.

Although not shown, the center of the first circular arc is located radially inward of the tread surface 4. Specifically, the center of the first circular arc is located on the equator plane CL. On the other hand, the center of the second circular arc is located radially outward of the tread surface 4. Specifically, the center of the second circular arc is located on a straight line connecting the center of the first circular arc and the center CG of the shoulder circumferential groove 38*s*. In the tire 2, it is sufficient that the distance in the radial direction from the inner edge 68*u* to the outer edge 68*s* of the shoulder circumferential groove 38*s* is at least within the range of 1 mm or greater and 3 mm or less, and the first circular arc and the second circular arc may or may not be tangent to each other at the center CG.

In the tire 2, the center portion 28 of the tread surface 4 is represented by one circular arc, but may be represented by a plurality of circular arcs. In this case, a virtual circular arc that passes through the inner edge 68*u* of one shoulder circumferential groove 38*s*, the equator PC, and the inner edge 68*u* of the other shoulder circumferential groove 38*s* is drawn and, if the deviation between the locus represented by the virtual circular arc and the locus represented by the first circular arc is within 2 mm, it is determined that the contour of the center portion 28 represented by the plurality of circular arcs is equivalent to the contour of the center portion 28 represented by the first circular arc. The deviation between the loci is measured along a line normal to the first circular arc.

In the tire 2, a side portion of the tread surface 4 is represented by one circular arc, but may be represented by a plurality of circular arcs. In this case, a virtual circular arc that passes through the outer edge 68*s* of the shoulder circumferential groove 38*s*, a center PM of an outer surface 72 of the shoulder land portion 40*s*, and the end PE of the tread surface 4 is drawn and, if the deviation between the locus represented by the virtual circular arc and the locus represented by the second circular arc is within 2 mm, it is determined that the contour of the shoulder portion 30 represented by the plurality of circular arcs is equivalent to the contour of the shoulder portion 30 represented by the second circular arc. The deviation between the loci is measured along a line normal to the second circular arc.

In the tire 2, the contour of the tread surface 4 is represented by a plurality of circular arcs. These circular arcs include the first circular arc which represents the contour of the center portion 28, and the second circular arc which is located axially outward of the first circular arc and represents the contour of the shoulder portion 30. The first circular arc is a circular arc that projects outward, and the second circular arc is a circular arc that projects inward. The contour of the tread surface 4 can contribute to proper contact between the shoulder portion 30 and a road surface and suppression of gaping at the shoulder circumferential groove 38*s*. In the tire 2, occurrence of wear at the shoulder portion 30 is suppressed. The contour of the tread surface 4 further contributes to elimination of constriction of the center portion 28 in the ground-contact surface. Thus, the influence of the center portion 28 on the rolling resistance is suppressed, and occurrence of wear at the center portion 28 is also suppressed. The contour of the tread surface 4 effectively contributes to reduction in the rolling resistance and suppression of occurrence of uneven wear. From this viewpoint, preferably, the contour of the tread surface 4 is represented by a plurality of circular arcs, these circular arcs include the first circular arc which represents the contour of the center portion 28, and the second circular arc which is located axially outward of the first circular arc and represents the contour of the shoulder portion 30, the first circular arc is a circular arc that projects outward, and the second circular arc is a circular arc that projects inward.

In the tire 2, the radius Rs of the second circular arc which represents the contour of the shoulder portion 30 is preferably larger than the radius Rc of the first circular arc which represents the contour of the center portion 28. Accordingly, the contour of the tread surface 4 effectively contributes to reduction in the rolling resistance and suppression of occurrence of uneven wear. From this viewpoint, the ratio of the radius Rs of the second circular arc, which represents the contour of the shoulder portion 30, to the radius Rc of the first circular arc, which represents the contour of the center portion 28, is preferably not less than 4.5 and preferably not greater than 6.5. In this case, the radius Rc of the first circular arc which represents the contour of the center portion 28 is preferably not less than 600 mm and preferably not greater than 700 mm.

As is obvious from the above description, according to the present invention, the heavy duty pneumatic tire 2 that can suppress occurrence of uneven wear without increasing the rolling resistance is obtained.

The embodiments disclosed above are merely illustrative in all aspects and are not restrictive. The technical scope of the present invention is not limited to the above-described embodiments, and all changes which come within the range of equivalency of the configurations recited in the claims are therefore intended to be included therein.

EXAMPLES

The following will describe the present invention in further detail by means of examples, etc., but the present invention is not limited to these examples.

Example 1

A heavy duty pneumatic tire (tire size=385/65R22.5) having the structure shown in FIG. 1 and having the specifications shown in Table 1 below was obtained.

In Example 1, the ratio (a/b) of the thickness a at the equator plane to the thickness b at the end of the belt was 1.05. The ratio (d/e) of the width d of the belt to the width e of the tread surface was 0.85. The ratio (e/f) of the width e of the tread surface to the camber amount f of the tread surface at the end of the tread surface was 20. The ratio (g/h) of the interval g between the two shoulder circumferential grooves to the camber amount h of the tread surface at the shoulder circumferential groove was 25. The thickness b at the end of the belt was set to 25.1 mm. The width e of the tread surface was 305.0 mm. The interval g between the two shoulder circumferential grooves was 171.0 mm.

In Example 1, the tilt angle θ2 of each belt cord included in the second belt ply (wide ply) was set to 14°. The tilt angle θ1 of each belt cord included in the first belt ply was set to 50°. The tilt angle θ3 of each belt cord included in the third belt ply was set to an angle equal to the tilt angle θ2. The tilt angle θ4 of each belt cord included in the fourth belt ply was set to 18°.

Examples 2 to 7 and Comparative Examples 1 to 4

In Examples 2 to 7 and Comparative Examples 1 to 4, the ratio (a/b), the tilt angle θ2, the ratio (d/e), the ratio (e/f), and the ratio (g/h) were set as shown in Table 1 and 2 below.

[Uneven Wear]

Sample tires were fitted onto rims (size=22.5×11.75) and inflated with air to adjust the internal pressure of the tire to 900 kPa. Each tire was mounted to the drive shaft of a truck-trailer. After a test driver drove the truck-trailer on general roads for 50,000 km, a step amount generated due to wear was measured as a wear amount after the running. The results are shown as indexes in Tables 1 and 2 below. A higher value represents that uneven wear is less likely to occur and that the wear resistance is better.

[Rolling Resistance Coefficient (RRC)]

A rolling resistance coefficient (RRC) when each sample tire ran on a drum at a speed of 80 km/h under the following conditions was measured using a rolling resistance tester. The results are shown as indexes in Tables 1 and 2 below. A higher value represents that the rolling resistance is lower, which is preferable.

Rim: 22.5×11.75
Internal pressure: 900 kPa
Vertical load: 44.13 kN

[Total Value]

The total of the indexes obtained in the respective evaluations was calculated. The results are shown in the cells for Total in Tables 1 and 2 below. A higher value indicates that the result is better.

TABLE 1

|  | Example 1 | Example 2 | Example 3 | Comparative Example 1 | Comparative Example 2 |
|---|---|---|---|---|---|
| a/b [—] | 1.05 | 0.95 | 0.95 | 1.10 | 0.90 |
| θ2 [°] | 14 | 15 | 16 | 14 | 14 |
| d/e [—] | 0.85 | 0.89 | 0.94 | 0.85 | 0.85 |
| e/f [—] | 20 | 21 | 35 | 20 | 20 |
| g/h [—] | 25 | 28 | 40 | 25 | 25 |
| Uneven wear | 100 | 100 | 100 | 100 | 88 |
| RRC | 100 | 100 | 100 | 87 | 101 |
| Total | 200 | 200 | 200 | 187 | 189 |

TABLE 1

|  | Comparative Example 3 | Comparative Example 4 | Example 4 | Example 5 | Example 6 | Example 7 |
|---|---|---|---|---|---|---|
| a/b [—] | 1.05 | 1.05 | 1.05 | 1.05 | 1.05 | 1.05 |
| θ2 [°] | 14 | 14 | 16 | 17 | 14 | 14 |
| d/e [—] | 0.85 | 0.85 | 0.85 | 0.85 | 0.85 | 0.85 |
| e/f [—] | 15 | 40 | 20 | 20 | 20 | 20 |
| g/h [—] | 25 | 25 | 25 | 25 | 20 | 45 |
| Uneven wear | 85 | 89 | 100 | 95 | 91 | 93 |
| RRC | 100 | 100 | 100 | 100 | 100 | 100 |
| Total | 185 | 189 | 200 | 195 | 191 | 193 |

As shown in Tables 1 and 2, in the Examples, occurrence of uneven wear is suppressed without increasing the rolling resistance. From the evaluation results, advantages of the present invention are clear.

INDUSTRIAL APPLICABILITY

The above-described technology for suppressing occurrence of uneven wear without increasing the rolling resistance can be applied to various tires.

REFERENCE SIGNS LIST 2 tire
4 tread surface
8 tread
10 sidewall
12 bead
14 chafer
16 carcass
18 belt
28 center portion
30 shoulder portion
36 end of belt 18
38, 38c, 38s circumferential groove
40, 40c, 40s, 40m land portion
48, 48A, 48B, 48C, 48D belt ply
50 wide ply
52 narrow ply
54 belt cord

The invention claimed is:

1. A heavy duty pneumatic tire having a nominal cross-sectional width not less than 355 mm and a nominal aspect ratio not greater than 70%, the heavy duty pneumatic tire comprising:
   a tread having a tread surface that comes into contact with a road surface; and
   a belt located radially inward of the tread, wherein
   a plurality of circumferential grooves are formed on the tread surface so as to be aligned in an axial direction,
   two circumferential grooves located axially outward among these circumferential grooves are shoulder circumferential grooves,
   a ratio of a width of the tread surface to a camber amount of the tread surface at an end of the tread surface is not less than 20 and not greater than 35, and
   regarding a thickness from the belt to the tread surface, a ratio of a thickness at an equator plane to a thickness at an end of the belt is not less than 0.95 and not greater than 1.05,
   wherein:
   a contour of the tread surface is represented by a plurality of circular arcs, the plurality of circular arcs include a first circular arc which represents a contour of a portion from an inner edge of one shoulder circumferential groove to an inner edge of the other shoulder circumferential groove, and a second circular arc which is located axially outward of the first circular arc and represents a contour of a portion from an outer edge of the shoulder circumferential groove to the end of the tread surface, the first circular arc is a circular arc that projects outward, and the second circular arc is a circular arc that projects inward, a portion from the inner edge of the shoulder circumferential groove to the outer edge of the shoulder circumferential groove is a boundary portion between the first circular arc and the second circular arc, and a distance in the radial direction from the inner edge to the outer edge of the shoulder circumferential groove is at least 1 mm or greater and 3 mm or less, and a center of the first circular arc is located on the equator plane, and a center of the second circular arc is located on a straight line connecting the center of the first circular arc and a center of the shoulder circumferential groove, the center of the shoulder circumferential groove being a center of an opening width of the shoulder circumferential groove and being located on a straight line connecting the inner edge and the outer edge of the shoulder circumferential groove.

2. The heavy duty pneumatic tire according to claim 1, wherein
a ratio of an interval between the two shoulder circumferential grooves to a camber amount of the tread surface at the shoulder circumferential groove is not less than 25 and not greater than 40.

3. The heavy duty pneumatic tire according to claim 2, wherein a ratio of a width of the belt to the width of the tread surface is not less than 0.85 and not greater than 0.94.

4. The heavy duty pneumatic tire according to claim 2, wherein
the belt includes a plurality of belt plies layered in a radial direction,
each of the belt plies includes a large number of belt cords tilted relative to the equator plane,
a belt ply having a maximum width among the plurality of belt plies is a wide ply, and
an angle formed by each belt cord of the wide ply with respect to the equator plane is not less than 14° and not greater than 16°.

5. The heavy duty pneumatic tire according to claim 4, wherein
a belt ply having a minimum width among the plurality of belt plies is a narrow ply, and
an angle formed by each belt cord of the narrow ply with respect to the equator plane is equal to the angle formed by each belt cord of the wide ply with respect to the equator plane, or larger than the angle formed by each belt cord of the wide ply with respect to the equator plane.

6. The heavy duty pneumatic tire according to claim 5, wherein
an end of the narrow ply is located outward of the shoulder circumferential groove in the axial direction.

7. The heavy duty pneumatic tire according to claim 5, wherein
a camber amount of the wide ply at an end of the wide ply is smaller than a camber amount of the tread surface at a position, on the tread surface, corresponding to the end of the wide ply.

8. The heavy duty pneumatic tire according to claim 4, wherein
a camber amount of the wide ply at an end of the wide ply is smaller than a camber amount of the tread surface at a position, on the tread surface, corresponding to the end of the wide ply.

9. The heavy duty pneumatic tire according to claim 8, wherein
a ratio of the camber amount of the wide ply at the end of the wide ply to the camber amount of the tread surface at the position, on the tread surface, corresponding to the end of the wide ply is not less than 0.7 and not greater than 0.9.

10. The heavy duty pneumatic tire according to claim 4, wherein
a belt ply having a minimum width among the plurality of belt plies is a narrow ply, and
an end of the narrow ply is located outward of the shoulder circumferential groove in the axial direction.

11. The heavy duty pneumatic tire according to claim 10, wherein
a camber amount of the wide ply at an end of the wide ply is smaller than a camber amount of the tread surface at a position, on the tread surface, corresponding to the end of the wide ply.

12. The heavy duty pneumatic tire according to claim 1, wherein
a radius of the second circular arc is larger than a radius of the first circular arc.

13. The heavy duty pneumatic tire according to claim 12, wherein
a ratio of the radius of the second circular arc to the radius of the first circular arc is not less than 4.5 and not greater than 6.5.

14. The heavy duty pneumatic tire according to claim 12, wherein
the radius of the first circular arc is not less than 600 mm and not greater than 700 mm.

* * * * *